Inventor:
Alfred M.A. Maillet
BY:
Karl F. Ross
Attorney

United States Patent Office 3,435,562
Patented Apr. 1, 1969

3,435,562
METHOD OF AND DEVICE FOR THE ABRASIVE SHAPING OF A WORKPIECE
Alfred M. A. Maillet, Versailles, Yvelines, France, assignor to La Soudure Electrique Languepin, La Plaine-Saint-Denis, Seine-Saint-Denis, France, a French body corporate
Filed July 19, 1966, Ser. No. 566,352
Claims priority, application France, July 20, 1965, 25,317
Int. Cl. B24b 7/00, 9/00
U.S. Cl. 51—60                              10 Claims

ABSTRACT OF THE DISCLOSURE

Method and apparatus for the shaping of a workpiece to an abrasive pattern of a tool having the configuration desired in the workpiece but dimensioned in each of a multiplicity of parallel sectional planes through the pattern to a predetermined extent smaller than the dimensions of the corresponding section through the finished configuration, the system involving urging the tool pattern against the workpiece and oscillating the tool linearly while rotating the direction of oscillation about an axis perpendicular to this direction.

---

Figure 1:
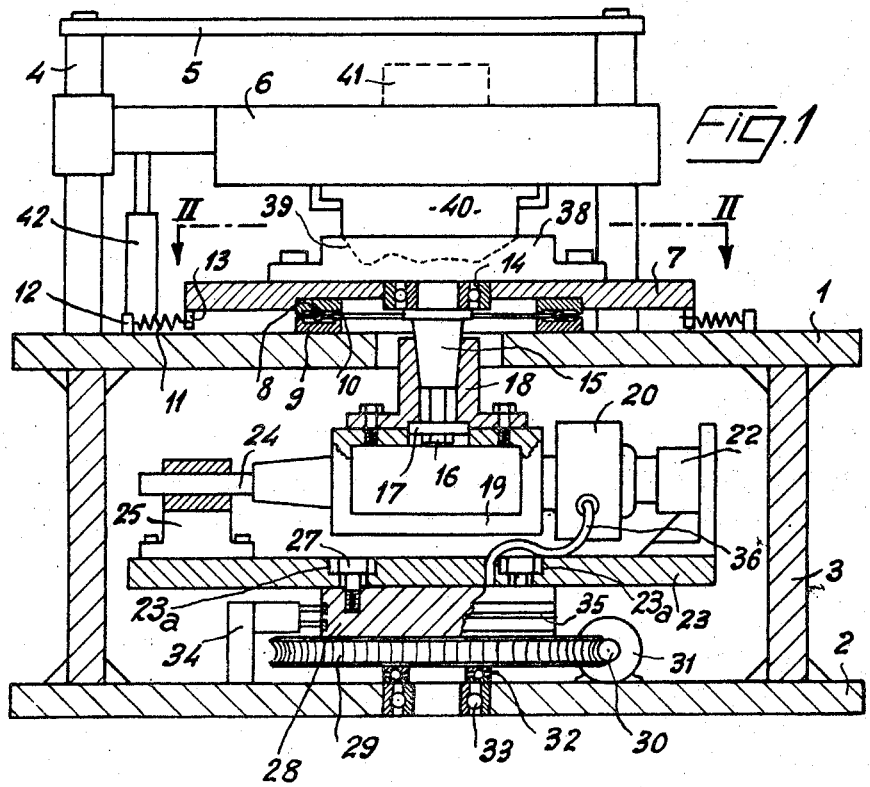

A method of mechanically machining a solid body, consisting in subjecting the latter to rapid and repeated vibrations of an abrasive surface, is already known from British Patent 602,801 of Apr. 14, 1945.

Thus a shaping tool, with an abrasive surface or an intermediate abrasive between the tool and the part to be machined, is brought close to the piece and is moved with a vibrating motion transversely in relation to the direction of approach of tool to piece. In addition, this vibration can be rectilinear or curvilinear.

The shape of the tool being optional, there is thereby attained a shaping of the piece as an impression or imprint of this tool.

Although in this previous suggestion, means are provided, besides, for agitating the tool and the piece in microscopic movements relative to one another, the direction of the motion which carries out the abrasion remains constant, a fact which involves the following major drawback: the impression obtained in the piece fits with some play on to the tool in the direction of the vibration only and not in the transverse direction, where the play can be much less. In other words, the variation in dimensions of the tool in relation to the piece depends on the direction of the vibration, and the shape of the imprint realized is not fully that of the tool.

The object of the present invention is an improved method of mechanical machining using an abrasive-supporting tool, having the configuration of the piece to be obtained, but with succeeding plane parallel sections, exactly the shape of the piece to be machined, but dimensions differing from those of the sections of this piece by a constant quantity.

In other words, the shape of the imprint generated by the tool is a perfectly regular enlargement of the shape of the tool. According to the invention, when the piece is pressed against the tool perpendicularly to the planes of the said sections, the tool is moved in relation to the piece, in an alternating motion of constant amplitude, whose direction is turning continually in relation to the tool and the piece, which retain the same relative orientation. Preferably, this alternating movement is vibratory and rectilinear. Curvilinear vibration, e.g. vibration around a torsion axis, can also be used.

Thus the effect of abrasion is obtained in all directions on the perpendicular plane to the direction of application of the piece against the tool, and the identity of shape, except for dimensions, between the tool and the piece is very exact.

The direction of vibration can rotate around a fixed center. However, the said center can also be moved, preferably, in an orbital motion of small radius, so that the vibration carries out a planetary rotation, which, on choosing the origin and the amplitude of the vibratory movement, permits adjustment of the dimensions of the piece obtained in relation to those of the electrode. Less advantageously the center can also be moved to follow any trajectory presenting a symmetrical center, e.g. a regular polygon.

Preferably, the plane of the vibrations is horizontal and the relative vertical advance movement of piece and tool is a function of the abrasive effect which necessitates, between piece and tool, the action of a vertical pressure which can sometimes be the simple result of weight. The force producing the advance can be adjusted by the effect of weights, of counterweights, or of springs or pneumatic pressure cylinders.

The following description regarding the annexed drawing, given as a non-limiting example, will explain more clearly how the invention can be embodied.

Figure 2:
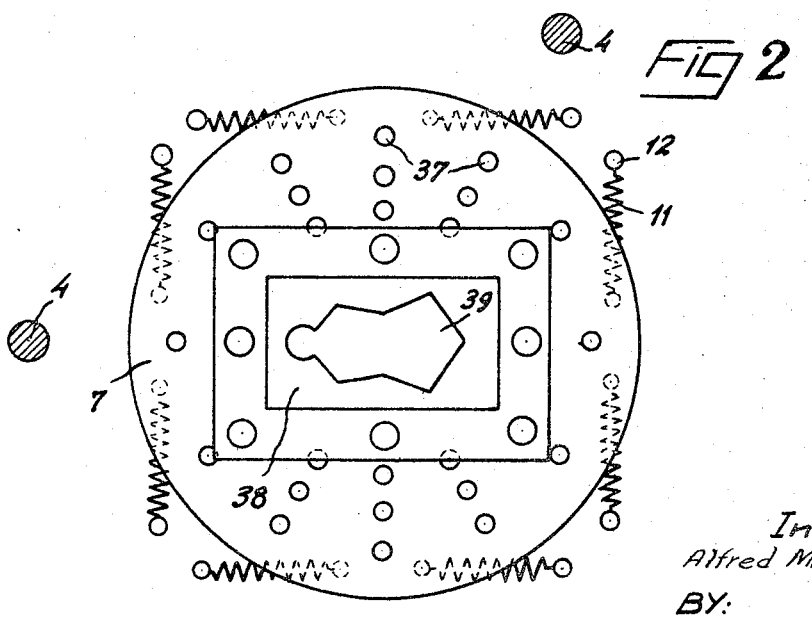

In the drawing:
FIG. 1 is a vertical section of a machining arrangement according to the invention; and
FIG. 2 is a section along line II—II of FIG. 1.

The structure for carrying out the method is made up of a table 1 supported on a base 2 by means of pillars 3. The table 1 is surmounted by columns 4 spaced at the top by a plate 5; on the columns 4, a carriage 6 is vertically slidable.

On table 1, a platform 7 can move without turning, i.e. in translation of a limited amplitude. To this end, platform 7 is supported by the balls 8 arranged in a circular crown between two flat slide-tracks 9 and 10. In addition, platform 7 is prevented from turning by the springs 11 of which each is attached, on the one hand, to a fixing-point 12 which is integral with the table 1, and, on the other hand, to a pin 13 fixed on the lower face of platform 7. In a known way, these springs 11, placed more or less tangentially to the platform are balanced so that they prevent the rotation of the latter in either direction, but do not resist motions of translation, as the platform remains always parallel to itself and pressed on table 1.

In order to keep the platform parallel to itself, one can also of course use a pantograph formed in a known way of two jointed parallelograms joined together by a cross-piece, or else again, two orthogonal slides, one fixed, the other sliding in the first, or any other known arrangement.

At the center of the platform is fitted a ball-bearing 14 whose interior race is integral with a conical spindle 15. This spindle is fixed, by an axial bolt 16 and a thrust-piece 17, in the socket in the shape of a truncated cone 18, which is supported by a vertical rectilinear frame 19. One of the small vertical sides of this frame is made integral with one of the two parts of an electromagnetic vibrator 20, whose other part is rigidly fixed to a bracket 22 integral with a platform 23. The bracket 22 is adjustable for length in order to allow choice of the origin of the vibratory movement in relation to the center of the platform.

The frame 19 includes, in the prolongation of the axis of the vibrator 20 and in a position diametrically opposed to the latter, of a stem 24 which can slide in a block 25 which likewise is fixed to the platform 23. The slide-block 25 can, besides, be formed with balls to facilitate the movement of the stem 24.

The platform 23 is made integral, by means of bolts 27, with the hub 28 which carries a toothed wheel 29 of large radius. The bolts 27 are fixed in the diametrical openings 23a of the platform 23, in such a way that the eccentricity of the platform in relation to the axis of the gear wheel 29 can be adjusted at will. The gear wheel 29 can be driven by the worm 30, which in turn is driven by the motor 31.

The assembly comprising the platform 23, the hub 28 and the wheel 29 is pivotably mounted at the foot of base 2, by means of a ball-bearing 32 and a plummer block 33. As shown, the hub 28 can be arranged for transmission of the current to the vibrator 20 through brushes 34, conducting crowns 35 and the conductor 36.

By means of the sets of threaded holes 37 arranged in the platform 7, a matrix 38 can be fixed on this platform, to constitute a machining tool. In the example shown, this matrix comprises a cavity 39 whose shape is that of the enlarged imprint of the piece to be obtained, and whose sidewalls are abrasive.

In a similar way, the piece to be machined 40 is fixed to the carriage 6. This piece can be made of more or less hard metal, copper, aluminum, or mild steel for example; it can also be of graphite, particularly for the manufacture of electrodes designed for electro-erosion.

The arrangement described above functions as follows:

When the vibrator 20 is set in motion, it imparts an oscillatory motion, diametrical in relation to the platform 23, to the frame 19, which transmits this movement to the platform 7, which, in consequence, vibrates in a direction corresponding to one of its diameters. However, because of the rotation of the worm 30, the direction of the vibration turns regularly around the axis of platform 7 which does not change its position. Thus, the matrix 38 vibrates successively in all directions on the horizontal plane.

By means of the weight of carriage 6, the piece to be machined 40 is pressed against this matrix 38. Thereupon the abrasive surfaces of cavity 39 act on the piece 40, shaping it into the image of this cavity. The piece 40 is thus machined in the image of the cavity 39 but with dimensions of its horizontal sections which are curves parallel to the sections of cavity 39, and are derived from the later by a reduction over the whole periphery equal to at least half the amplitude of the vibratory movement, and at the most of that amplitude. The fraction of the amplitude comprised between 0.5 and 1 depends on the origin of this movement in relation to the centre of the platform; this fraction can be raised by the eccentricity of this platform in relation to the axis of the hub 28.

In order to fix these ideas, the frequency of the vibration can be from one to 200 per second, for example 100 for a normal feeding action at 50; the amplitude of the vibration can advantageously, be less than 1 mm. and the rotation speed of the platform 23 can extend from a few turns per minute to some tens of turns per second.

In order to increase the pressure of piece 40 against the shaping matrix, the carriage 6 can be loaded with weights 41. Inversely, in order to reduce the pressure, the carriage's descent can be slowed e.g. by arrangements 42 supplying an upward effort, e.g. by means of springs or compressed fluid.

What I claim is:

1. A method of shaping a workpiece to a predetermined configuration with an abrasive along the surface of a tool of complementary configuration and dimensions in each of a multiplicity of parallel sectional planes less than the corresponding all-round dimensions of the workpiece configuration by a constant quantity, comprising the steps of:
   (a) urging said tool and said workpiece into contact with one another in a first direction perpendicular to said sectional planes;
   (b) relatively vibrating said tool and said workpiece with constant amplitude in a second direction perpendicular to said first direction and parallel to said sectional planes; and
   (c) relatively rotating said tool and said workpiece about an axis perpendicular to said sectional planes whereby said second direction of vibration is turned about said axis.

2. The method defined in claim 1 wherein said tool and workpiece are relatively vibrated in step (b) in a horizontal plane and said tool and workpiece are urged together in step (a) in vertical direction.

3. The method defined in claim 2 wherein said workpiece and said tool are urged into contact with one another in step (a) by applying gravitational force to said tool.

4. The method defined in claim 1, further comprising the step of rotating said axis about a further axis parallel to the first-mentioned axis and extending perpendicular to said sectional planes.

5. The method defined in claim 4 wherein the first-mentioned axis describes a circular path about the second axis.

6. A device for shaping a workpiece to a predetermined configuration, comprising a tool adapted to abrasively erode said workpiece and having a surface of a configuration complementary to that of a workpiece upon shaping and dimensions in each of a multiplicity of parallel sectional planes less than the corresponding dimensions of the workpiece configuration by a constant quantity; means for urging said tool and said workpiece into contact with one another in a first direction perpendicular to said sectional planes; means for relatively vibrating said tool and said workpiece with constant amplitude in a second direction in a plane perpendicular to said first direction and parallel to said sectional planes; and means for relatively rotating said tool and said workpiece about an axis perpendicular to said sectional planes whereby said second direction of vibration is turned about said axis.

7. The device defined in claim 6 which comprises support means, an oscillatable nonrotatable platform mounted upon said support means and carrying said tool; a frame connected with said platform and linearly vibratable in said second direction and generally along a diameter of the platform; turntable means rotatably supporting said framework for swinging same about said axis; and a rotation coupling connecting said framework to said platform for transmitting vibration thereto upon rotation of said framework.

8. The device defined in claim 7, further comprising a plurality of pairs of oppositely effective springs acting tangentially upon said platform and anchored to said support means for accommodating linear displacement of said platform while preventing rotation thereof.

9. The device defined in claim 7, further comprising roller-bearing means oscillatingly supporting said platform on said support means.

10. The device defined in claim 7, wherein said turntable means includes a driven gear, a turntable mounted on said driven gear, and bearing means on said turntable carrying said framework, said device further comprising means between said turntable and said driven gear for adjusting the position of said framework in said second direction.

References Cited

UNITED STATES PATENTS

| | | | |
|---|---|---|---|
| 2,321,441 | 6/1943 | Webber | 51—281 |
| 2,792,674 | 5/1957 | Balamuth | 51—317 |

JAMES L. JONES, JR., *Primary Examiner.*

U.S. Cl. X.R.

51—281